H. QUERTIER.
RECORDER FOR WEIGHING MACHINES.
APPLICATION FILED AUG. 5, 1910.
1,125,710.
Patented Jan. 19, 1915.
3 SHEETS—SHEET 2.
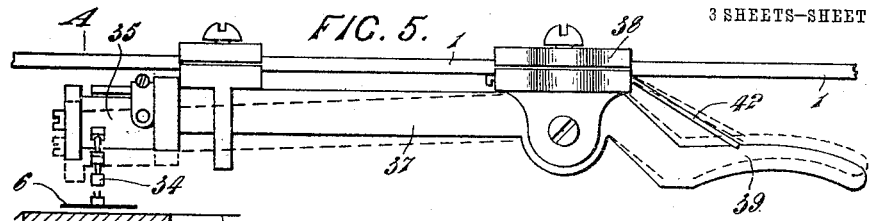
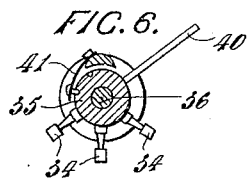
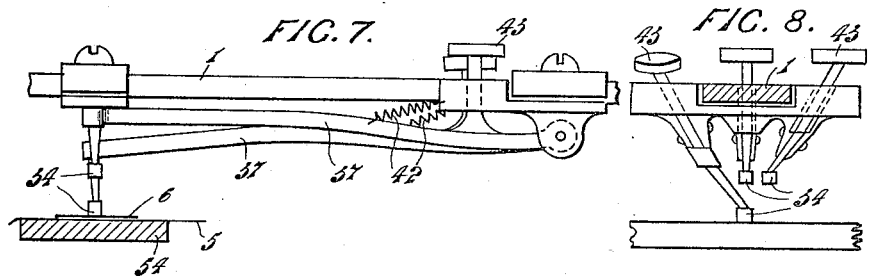
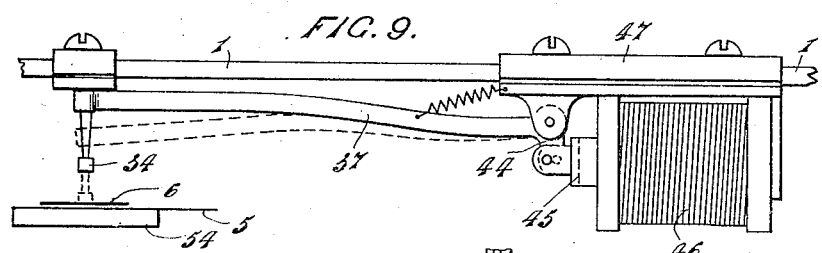
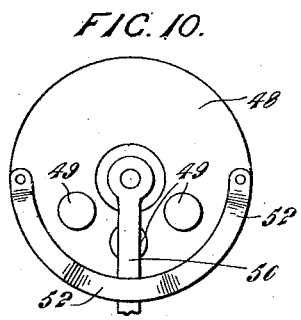
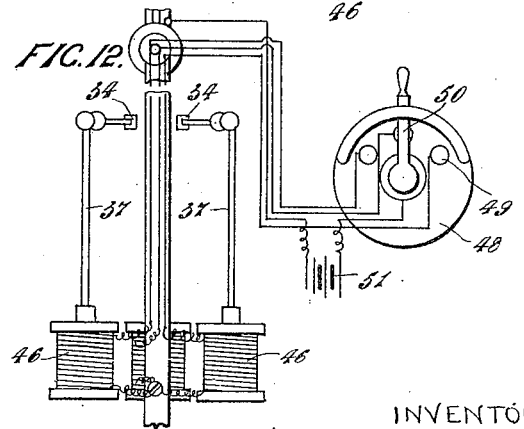
WITNESSES:
W. H. Berrigan
John N. Hoving
INVENTOR.
HILARY QUERTIER
by H. Van Derveer
Attorney H. QUERTIER.
RECORDER FOR WEIGHING MACHINES.
APPLICATION FILED AUG. 5, 1910.
1,125,710.
Patented Jan. 19, 1915.
3 SHEETS—SHEET 3.
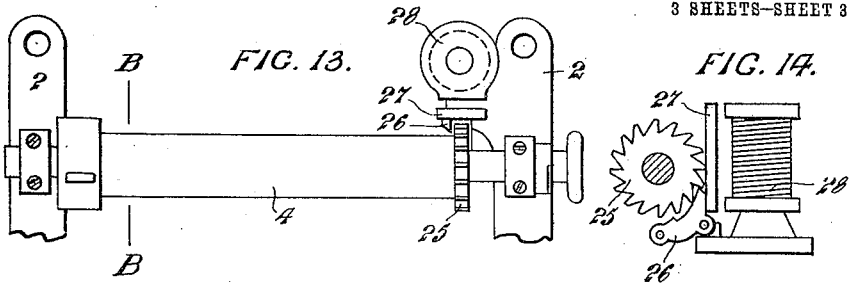
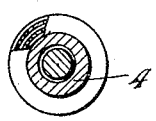
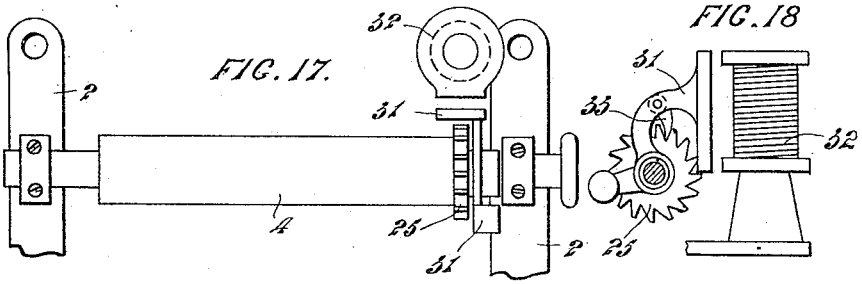
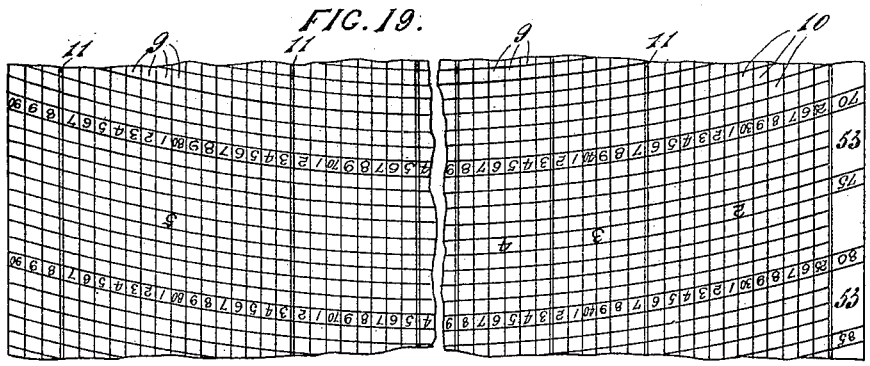
WITNESSES:
INVENTOR,
HILARY QUERTIER,
by
Attorney.

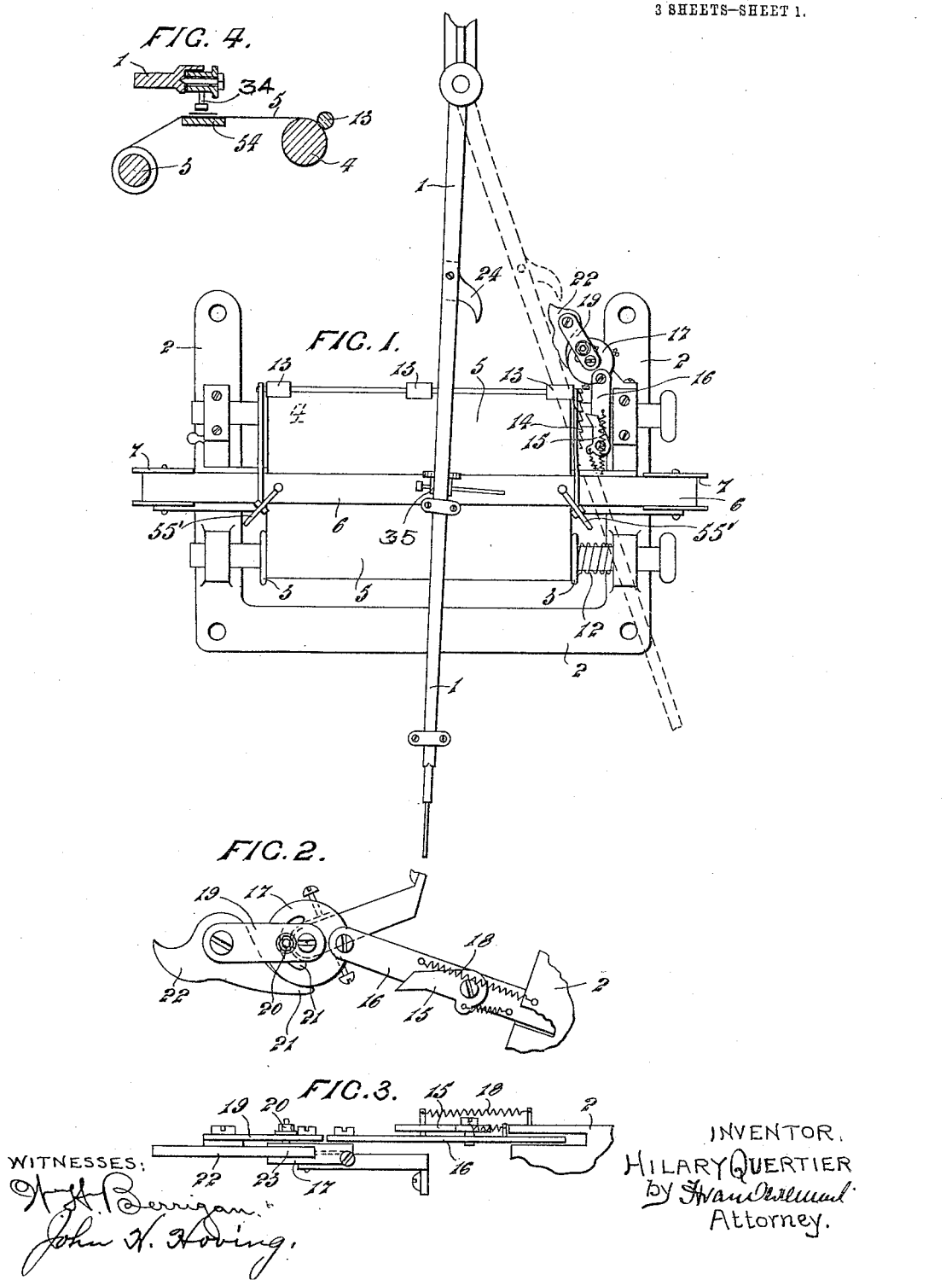

UNITED STATES PATENT OFFICE.

HILARY QUERTIER, OF WELLINGTON, NEW ZEALAND.

RECORDER FOR WEIGHING-MACHINES.

1,125,710.  Specification of Letters Patent.  Patented Jan. 19, 1915.

Application filed August 5, 1910. Serial No. 575,792.

*To all whom it may concern:*

Be it known that I, HILARY QUERTIER, subject of the King of Great Britain, residing at Wellington, New Zealand, engineer, have invented a new and useful Recorder for Weighing-Machines; and I do hereby declare the following to be a full, clear, and exact description of the same.

This invention relates to means that have been devised for the purpose of recording upon a tape or tapes the weights, grades, qualities and tallies of articles weighed upon a weighing machine.

The invention has been particularly designed for use in recording the weights, grades and tallies of the carcasses treated at meat freezing and other like places, and in some cases also the qualities of such carcasses. The means devised may, however, be adapted to any other purpose or industry in which a record is required to be kept of the weights, grades and qualities of articles or commodities treated.

In describing the invention it will be described in relation to means for use in weighing meat carcasses, but it will be readily understood that the different parts may be easily adapted for other purposes without departing from the main principles governing their construction and operation. The means devised for this purpose consist in the use of types or dies that are automatically positioned in relation to the surface of traveling paper bands or tapes by the movements of the weighing machine beam, and are then caused to imprint upon such band by mechanical or electrical actuating apparatus.

In fully describing the invention reference will be made to the accompanying sheet of drawings, in which:—

Figure 1 is a front elevation of one manner of carrying out the invention. Fig. 2 is a face view, and Fig. 3 a side view of means employed for feeding the recording tape or band on each movement of the weighing machine beam. Fig. 4 is a diagram illustrating the manner of effecting the marking. Fig. 5 shows a type attachment adapted to be actuated by hand. Fig. 6 is a cross section thereof taken on the line A—A. Fig. 7 is a side elevation, and Fig. 8 an end elevation of an alternative construction of hand actuated type. Fig. 9 is an elevation of an electrically actuated type. Fig. 10 is a plan, and Fig. 11 a side elevation of a switch suitable for actuating the electrical type shown in Fig. 9. Fig. 12 is a diagram illustrating the electrical connections of the type and switch. Figs. 13 and 14 are respectively front and end elevation of electrically controlled tape or band feed mechanism. Fig. 15 is a cross section taken on the line B—B of Fig. 13. Fig. 16 is a detail view of a mechanically controlled tape or band feed mechanism. Figs. 17 and 18 are front and end elevation respectively of means for electrically operating the tape mechanism. Fig. 19 is a view of portion of the traveling band or tape employed in conjunction with the means shown in Fig. 1.

Referring to the means shown in Figs. 1 to 4:—1 represents the ordinary arm or beam of the weighing machine that is arranged to swing upon a pivot and to indicate upon a graduated scale the weight of the carcass upon the machine in a manner that is well known.

2 represents the frame of the invention which is secured in a suitable position such that the arm 1 in its movements will pass across its face. Upon the frame the feed rollers 3, 4 are mounted so as to be free to rotate and to feed the paper tape or band 5 from one roller to the other and to cause such tape to travel beneath an inking ribbon 6 extending across the frame 2. This inking ribbon is carried by spools 7 so that it may be moved to present a fresh surface as required.

Upon the arm 1 the types or markers 34 are carried. These may be made in a number of ways to be hereinafter more fully described. They are thus carried with the arm in its movements across the paper band or tape 5 and above the ribbon 6 so that when depressed they will imprint through the ribbon on to the band at the point thereon varying with the position to which the arm is moved by the varying weights placed upon the weighing machine.

The tape or band will preferably have its surface divided as shown in Fig. 19 being divided longitudinally into divisions 9 representing units of weight and transversely into divisions 10 representing the numbers of the carcasses weighed. These latter divisions are arranged in curves concentrically with the center of the arm or beam 1 so that the types 34 on such arm or beam in the movements will follow the transverse markings on the tape beneath them. The longitudinal weight divisions 9 are so disposed that they will coincide with the different positions assumed by the types on the arm as such arm is moved under the influence of the weights upon the weighing machine. Thus when a carcass is placed on the machine to be weighed, its weight may be recorded by causing the type to mark upon the tape at the position to which it is moved. Its grade (in cases where grade is governed by limits of weight) may also be recorded by dividing the tape longitudinally into spaces representing such limits of weight as provided for by the divisions 9. These divisions may then be represented by the double lines 11 shown in Fig. 19.

The tape 5 is adapted to be fed along at each complete movement of the arm 1, a distance equal to one of the transverse divisions 10 of the tape, so that as each article is placed upon the machine a fresh division is moved into position beneath the type. These divisions being numbered thereby provide for a tally of the weights recorded being automatically kept. Means for effecting this travel of the tape 5 are shown in Figs. 1 to 3. In these means the tape is caused to travel from the roller 3 to the roller 4 and the requisite tension thereon is maintained by means of the spring 12 surrounding the spindle of the roller 3 and the gripping rollers 13 engaging against the surface of the roller 4 and kept in close engagement therewith. A ratchet wheel 14 is secured to one end of the roller 4 and a spring actuated pawl 15 is pivoted upon a sliding bar 16 secured at one end to a disk 17 and at the other, by means of a spring 18, to the frame 2. The disk 17 is mounted on a central pivot which also carries an arm 19 secured to the disk but adjustable in its position by means of the set screw 20 fitting into the curved slot 21 in the disk. To the outer end of the arm the cam or pawl 22 is pivoted. This pawl has an inner end 21 that engages with the edge of the disk and serves to prevent its outer end turning in one direction. It is however free to turn in the other direction. A tooth 24 is fixed to the arm 1 in such a position that as such arm moves to and fro the tooth will engage with the pawl 22. On the forward movement of the arm, this engagement of the tooth with the pawl will cause a partial rotation to be imparted to the disk 17 which in turn will draw the bar 16 and pawl 15 up so that such pawl engaging with the ratchet teeth 14 will convey a corresponding partial rotation to the feed roller 4. As the tooth 24 passes over the pawl, the several springs will return the parts to their normal position. On the return movement of the arm, the tooth 24 will merely rock over the pawl. The throw of the bar 16 and consequently the amount of rotation imparted to the feed roller 4 is governed by the position of the arm 19 in relation to the slot 21 in the disk 17 such positioning providing for a longer or shorter engagement of the tooth 24 with the pawl as the arm 1 moves forward.

Alternative means for feeding the tape forward intermittently are shown in Figs. 13 to 18. In the means shown in Figs. 13 to 16 the roller 4 is adapted to be revolved continuously under the action of a spring in the well known manner. In Figs. 13 and 14 it is shown as being held from movement by means of a ratchet wheel 25 secured thereon and with which a pawl 26 engages. This pawl is attached to a pivoted armature 27 of an electro-magnet 28 and is adapted when the magnet is energized to rock and free the ratchet so that the roller may rotate. On the electric current being broken the pawl reëngages with the ratchet. In Fig. 16 a pawl 29 is pivoted to the frame and normally engages with the teeth of the ratchet wheel 14. A tipping lever 30 is also pivoted to the frame and is adapted to be engaged and tipped by the tooth 24 on the arm 1 as the arm moves outward and to lift the pawl 29 out of engagement with the ratchet wheel. In Figs. 17 and 18, the roller 4 is adapted to be rotated by means of the counterweighted swinging armature 31 of the electro-magnet 32 and carrying a pawl 33 that engages with the teeth of the ratchet wheel 25. When the magnet is energized the armature 31 is caused to rock inward thereby causing the roller 4 to be turned forward, and when the current is broken, the armature will return to its normal position ready to move the roller forward on the magnet being again energized.

Various forms of types or markers may be attached to the arm 1. In each of such forms shown in the drawings provision is made for any one of three different characters being impressed upon a tape 5, such characters representing different qualities and thereby providing for a tally of the different qualities of carcasses weighed upon the machine being kept. In the means shown in Figs. 5 and 6 these dies 34 are fixed to radiate from a cylindrical block 35 that is mounted to rotate upon a central pin 36. This pin is carried by an arm 37 pivoted to a clamp 38 attached to the arm 1 and is provided with a finger piece extension 39 which when raised will cause the other end to be depressed. The die to be used will be turned to the vertical position by rotating the block 35 by means of an arm 40 or the like and will then be retained in that position by the spring tooth 41 (Fig. 6) engaging with a small notch in the surface of the block. The arm 37 is kept normally raised by the spring 42 (Fig. 5) so that when it has been depressed to cause its positioned die to mark upon the tape 5, and is released, it will be raised clear of the tape again.

In the means shown in Figs. 7 and 8, each die 34 is attached to the outer end of a separate arm 37 which is adapted to be depressed against the action of the spring 42 by means of the finger push 43. In this case the several dies are so disposed that each, when depressed, will engage with the tape 5 in the same position as the other.

In Figs. 9 to 12 means for electrically actuating the dies are shown. In these means each arm 37 is provided with a right angled extension 44 that is pivotally attached to the core 45 of an electric solenoid 46 carried on a frame 47 attached to the arm 1. Upon the solenoid being energized, the core will be drawn in, thereby depressing the outer end of the arm 37 in the manner required. Instead of the solenoid, an electro-magnet may be employed. A suitable switch for use in operating the respective die arms is shown in Figs. 10 and 11. A switch block 48 is provided and in it are arranged the contact studs 49 corresponding in number to the dies and respectively arranged in circuit with the solenoids 46. A spring switch arm 50 is pivoted to the block and is adapted to pass above the several studs and to be pressed into contact with either one of them. The switch arm 50 is arranged in circuit with one pole of the battery 51 (Fig. 12) and the several studs 49 are connected with the other pole of the battery through their respective solenoids or magnets so that when the switch arm is pressed into contact with one of the studs, the circuit through its solenoid is completed and the corresponding die arm actuated in the manner required. The manner of thus connecting the several parts is clearly shown in the diagrammatic view Fig. 12. A guide plate 52 is arranged above the switch arm 50 and is so shaped as to tend to prevent the switch being positioned at any point between two of the studs and thus caused to connect with two studs at the same time. These typing and marking means may be varied in a number of ways and when only one grade is to be recorded, a single die will be employed. In using the means, the operator will note the quality of the article being weighed and will then cause the corresponding die to impress the desired character in the space upon the tape corresponding to its weight and grade and to its number in the order with which it has been weighed thus enabling also the record of the graders and qualities being made as well as the weights and tallies of the articles. The edges of the tape 5, as shown in Fig. 19 are left with blank spaces 53 along them and small types 55' (Fig. 1) are arranged on the machine frame above such spaces so as to mark thereon. These types may be employed for keeping records of rejected articles or other incidental matters required in the operations of the machine. The tape 5 will in all cases preferably pass across a table 54 positioned immediately beneath the types and adapted thus to provide a rigid support when the types descend on to the tape and consequently to insure of a good impression being made.

What I do claim as my invention, and desire to secure by Letters Patent is:—

1. In a means for the purpose specified; the combination, with the pivoted arm of a weighing machine, of types thereon; means for feeding tape across a path of the types and parallel to the plane of movement of the arm; and an operative connection between the feeding means and the arm.

2. In a means for the purpose specified, the combination, with the pivoted arm of a weighing machine, of a plurality of type movable thereon relative thereto; means for feeding tape across a path of the type and parallel to the plane of movement of the arm; and an operative connection between the feeding means and arm, whereby the feeding means is automatically actuated on each actuation of the arm.

3. In a means for the purpose specified, the combination of a single pivoted arm of a weighing machine movable in a single plane; a plurality of types pivotally mounted on said arm for printing movement in a line definite relative to said arm and substantially transverse to said plane, the types being adapted to be moved relatively into and out of said line; and means for feeding tape across the path of printing movement of said types parallel to said plane and substantially parallel to one position of said single arm.

4. In a means for the purpose specified, the combination of, a pivoted arm; means for feeding tape parallel to the plane of movement of the arm; an operative connection on the feeding means and the arm; and means on said arm for printing on said tape any one of several different characters while said arm is at rest.

5. In a means for the purpose specified, the combination, of, a pivoted arm; means for feeding tape parallel to the plane of movement of the arm; an operative connection on the feeding means and the arm; and movable types on said arm for printing on said tape any one of several different characters while said arm is at rest.

6. In a means for the purpose specified, the combination of, a single pivoted arm; means for feeding tape parallel to the plane of movement of the arm; an operative connection on the feeding means and the arm; and movable types on said arm for printing on said tape any one of several different characters while said arm is at rest.

7. In a means for the purpose specified, the combination, with the pivoted arm of a weighing machine, of types thereon; means for feeding tape across a path of the types and parallel to the plane of movement of the arm; and an operative connection between the feeding means and the arm.

8. In a means for the purpose specified, the combination, with the pivoted arm of a weighing machine, of types thereon; means for feeding tape provided with longitudinal and curved transverse rulings fed across the path of the types and parallel to the plane of movement of the arm; and an operative connection between the feeding means and the arm.

In testimony whereof, I have signed this specification in the presence of two subscribing witnesses.

HILARY QUERTIER.

Witnesses:
W. ALEXANDER,
M. E. BROWN.

Copies of this patent may be obtained for five cents each, by addressing the "Commissioner of Patents, Washington, D. C."